R. A. GREENE.
METHOD AND APPARATUS FOR BLANCHING WHOLE PEANUTS.
APPLICATION FILED MAR. 29, 1922.

1,434,815.

Patented Nov. 7, 1922.
3 SHEETS—SHEET 1.

INVENTOR
Richard A. Greene
BY
ATTORNEY

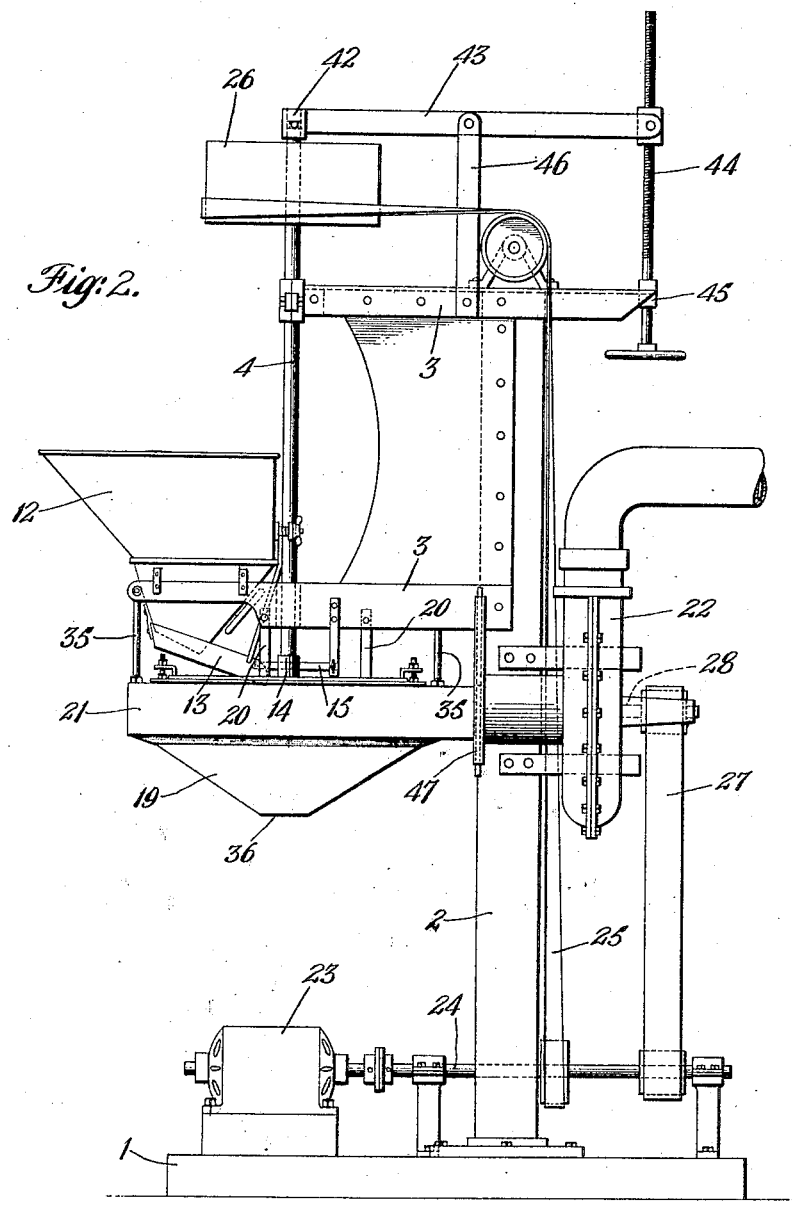

R. A. GREENE.
METHOD AND APPARATUS FOR BLANCHING WHOLE PEANUTS.
APPLICATION FILED MAR. 29, 1922.
1,434,815.
Patented Nov. 7, 1922.
3 SHEETS—SHEET 3.
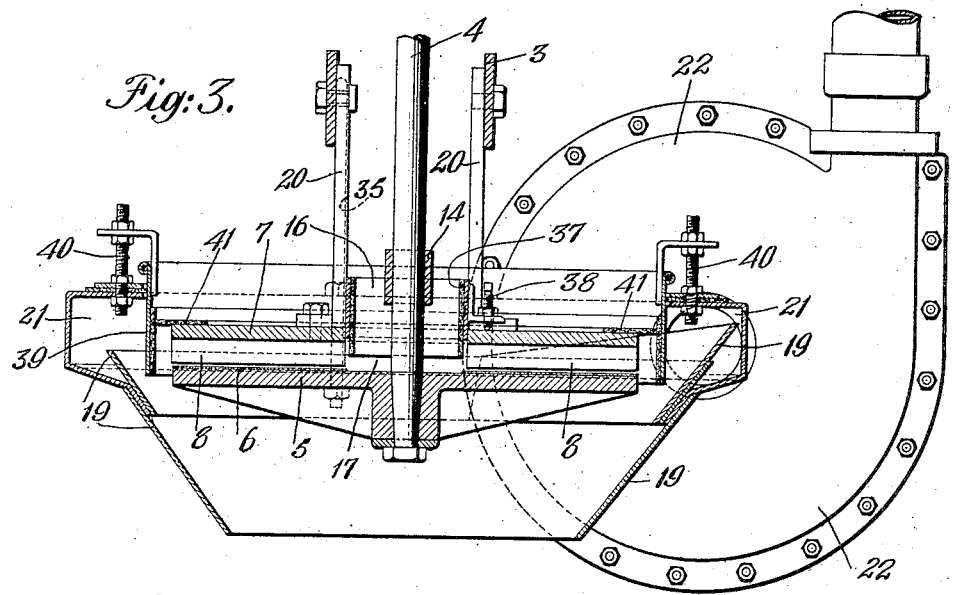
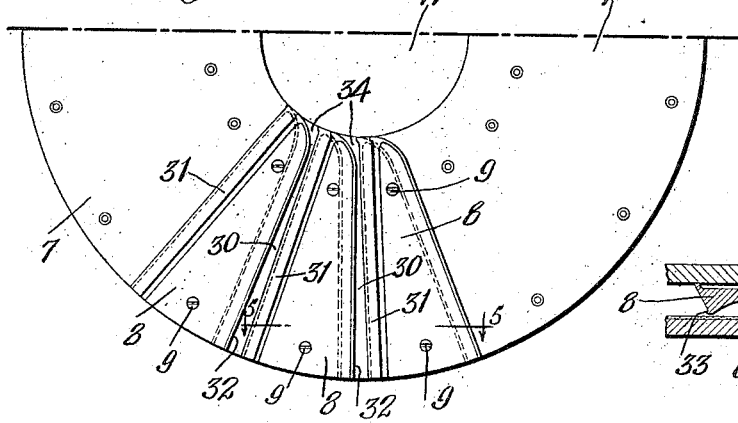
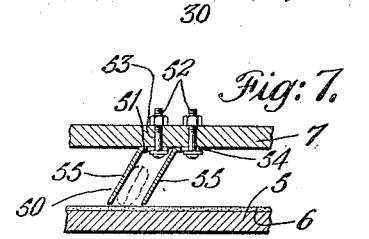
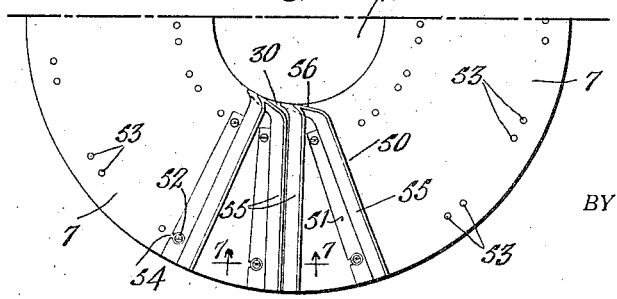
INVENTOR
Richard A. Greene
BY
ATTORNEY Patented Nov. 7, 1922.

1,434,815

UNITED STATES PATENT OFFICE.

RICHARD A. GREENE, OF BROOKLYN, NEW YORK, ASSIGNOR TO JABEZ BURNS & SONS, A CORPORATION OF NEW YORK.

METHOD AND APPARATUS FOR BLANCHING WHOLE PEANUTS.

Application filed March 29, 1922. Serial No. 547,604.

*To all whom it may concern:*

Be it known that I, RICHARD A. GREENE, a citizen of the United States, and a resident of Brooklyn, in the county of Kings and State of New York, have invented certain new and useful Improvements in Methods and Apparatus for Blanching Whole Peanuts, of which the following is a specification.

This invention relates to a method and apparatus for blanching whole peanuts, and has particular reference to a novel method and apparatus, whereby the peanuts are subjected to a preliminary treatment and then blanched, the object of the invention being to effect such blanching with a minimum production of flats.

At the present time there are numerous machines on the market for roasting peanuts and also for removing the skins, but these machines have not been satisfactory where it is desired to produce large quantities of whole blanched peanuts to be thereafter salted, there being at present a considerable demand for whole salted peanuts, which command a better price than salted nuts partly whole and mostly of flats.

I have discovered that in order to produce whole blanched nuts, with a minimum percentage of flats, and suitable for salting whole, particular attention must be given to the roasting as well as the blanching, and for this particular purpose special forms of both roaster and blancher are desirable, since error in roasting will tend to increase the number of flats and an incorrect method of blanching will likewise do so, even though the roasting be correct. In roasting, it is necessary to only partially roast the nuts, sufficient to enable the skin to come off with very slight effort, and the roasting must also be conducted so that the nut will not be burned in spots, or a temperature avoided which tends to decompose the delicate, volatile oils in the peanut. In order to accomplish the proper roasting preliminary to thereafter blanching without an excessive number of flats, I have found that the roasting should be done in a current of hot gases while continually tumbling the peanuts on a moving surface, the result being that the heat is practically all in the gases and the surface does not become overheated. Thereby the heat is applied evenly to the entire peanut so that the skin readily loosens and yet without burning the peanut in spots or decomposing the oils. Peanuts which are burned in spots are unacceptable for salting whole, as uniform appearance is required. Moreover, a peanut spotted by burning, even if edible, tends to split more easily than one evenly, partially roasted.

With the peanuts properly roasted there yet remains the provision for a suitable blanching method, whereby the results of proper roasting will not be lost. I have discovered that a suitable blanching method requires that the skins be initially broken or removed by gentle impact or abrasion, while the peanut is preferably propelled in free but gentle tumbling movement so as not to split. Preferably I employ an air blast for propelling the nut, having the further function of tearing off and carrying away the skins so that whole nuts are discharged from the machine, free of skins, and requiring at most only a simple picking operation to remove the relatively few flats.

I have found a suitable form of roaster to be one wherein shelled nuts are placed in a perforated, rotating, horizontal drum, and heated gases from a burner at a distance therefrom such that the flame cannot touch the drum (as it does in many common types of coffee and peanut roasters) pass through the perforations and then through the nuts while they are being continuously tumbled. The gases are drawn out through one end of the drum or through the top of the casing and thence led to a stack or other discharge, and the nuts after being thus evenly roasted without burned spots or decomposition of the oils are discharged from the drum, cooled, and are then ready for blanching.

I have found that a special form of blancher is required to treat such partially roasted nuts, as the forms of blanchers heretofore used produce too large a percentage of flats to be economical. One type of blancher is the rotary or other moving brush type similar to grain scourers, etc., which is wholly unsuitable because of using too much pressure and producing practically all flats, or else in getting the skins off. There is also known to the art a blancher not especially designed for partially roasted whole peanuts to be thereafter salted, in which the skin of the unroasted nut is to be rubbed off by being fed through a spiral channel in contact with a rotary abrading disk, and such general type of blancher has also been proposed in a modified form for abrading the skins from peanuts.

A special form of blanching method and apparatus, to be specifically claimed herein, produces a minimum quantity of flats, wherein the nuts roasted as above described are fed in at the center of a rotating disk having a roughened surface, and are fed outwardly thereon through guide channels by an accurately controlled air blast, the combined result of which is to gently tumble the nuts over and over through the channels while the skins separate and are drawn away by the air blast, the whole nuts thereafter being cooled and salted according to usual pactice.

With these and other objects in view, I have devised the method and apparatus embodying my invention as described in the following specification and illustrated in the accompanying drawings, of which—

Figure 2 is an elevation of the blancher.

Figure 3 is a vertical section of the blancher on an enlarged scale.

Figure 4 is an inverted plan view of the blancher cover carrying the channels.

Figure 5 is a detailed section taken on the line 5—5 of Figure 4.

Figure 6 is a fragmentary inverted plan view of the blancher cover showing a modified form of channel, and Figure 7 is a section taken on the line 7—7 of Figure 6.

Figure 1:
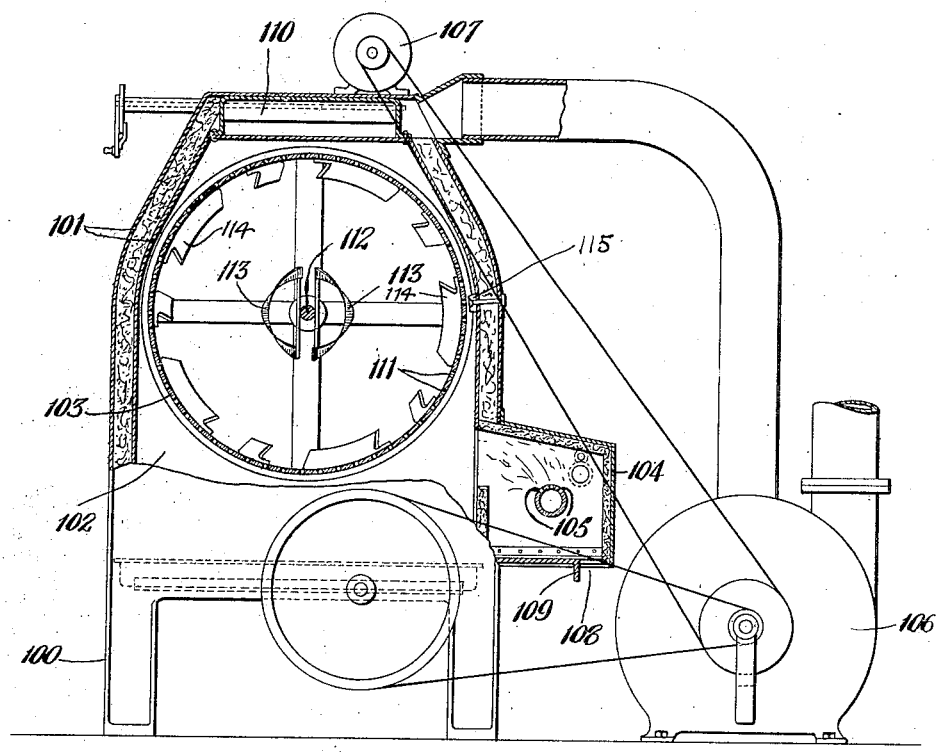
Figure 1 is a transverse sectional view of the roaster.

Referring to the drawing, Figure 1 indicates the roaster, comprising frame 100, walls 101 forming a closed compartment 102, and drum 103 rotatably mounted in said frame within compartment 102. Communicating with compartment 102 is heating box 104 having jets 105 connected to a supply of gaseous fuel. Other suitable heating means may be employed if desired. Blower 106 driven by motor 107 exhausts the heated air and combustion products from compartment 102, fresh air being admitted to heating box 104 through opening 108 controlled by damper 109. Damper 110 in the outlet from compartment 102 also regulates the flow of gases. Drum 103 has perforations 111 to admit the heated gases, said perforations being of proper size to retain the shelled peanuts. Drum 103 is preferably closed at one end, and the other end abuts a stationary closure member having a feed hopper and a discharge door. The heated gases enter drum 103 through perforations 111 and are exhausted through an opening between the upper portion of the end of said drum and said closure member. A sealing strip 115 of asbestos or other suitable material closes up the clearance space between drum 103 and the adjacent wall, thereby directing the heated gas into the lower portion of the drum. Drum 103 is secured to shaft 112 rotatably carried in frame 100 and driven at slow speed from motor 107, preferably through the blower shaft. Adjacent shaft 112 and within drum 103 are helical guide or baffle vanes 113 so disposed in relation to the direction of rotation as to convey the peanuts away from the feed hopper in the end closure member, while on the inner surface of drum 103 are helical guide or baffle vanes 114 oppositely directed so as to convey the peanuts toward the discharge door. The slow rotation of drum 103 thus effects a thorough but gentle agitation of the peanuts and subjects them to absolutely uniform heating conditions.

The blanching apparatus is shown in Figures 2 to 5 inclusive, wherein 1 represents a base carrying a column 2 having at its upper end arms 3 in which is mounted a vertical shaft 4, carrying at its lower end the removable disk 5 having a roughened surface 6 preferably composed of rather coarse aloxite cloth which is cemented to the disk. A stone or emery wheel could be used instead, but it is found that after some use the surface takes up oil from the nuts and requires cleaning, as with a wire brush or a solvent of peanut oil, so it is more convenient to provide each machine with two disks one of which is a reserve, so that the abrasive cloth facing on the other can be renewed and allowed to set ready for use. The disk herein shown is preferably flat but it may be coned or curved if desired. Above the disk is a stationary cover 7, suspended from arms 3 by stay-rods 20. Bolted as at 9, or otherwise suitably secured to the under surface of cover 7 are sectors 8, preferably of cast iron, and arranged to provide a plurality of more or less radial channels 30. The walls of channels 30, determined by edges 31 and 32 of sectors 8, are inclined downwardly in the direction of rotation of the disk, as shown in the drawing, the preferable inclination being about $62\frac{1}{4}°$ from the plane of the disk. Working edge 31, which is the edge over-hanging the disk and against which the peanuts are impelled by the rotation of the latter, rises vertically as at 33, from the disk for a distance of about $\frac{1}{4}$ inch, the remaining surface of said edge above this vertical wall having the inclination above described. The purpose of vertical walls 33 is to facilitate the feeding of such flats as may accidentally be introduced into the machine. The flats, on hitting the vertical wall, will be drawn along by the air current or pushed by the round nuts, and will not wedge or jam. The best results are obtained by arranging sectors 8 so that vertical walls 33 are slightly off-set from strictly radial alignment, such off-set being opposed to the direction of rotation of disk 5 with respect to the outer ends of channels 30, and in the direction of such rotation with respect to the inner ends of said channels, the effect of such off-set tending to retard the nuts in their outward passage through the channels. Feed is effected by means of an air current of just sufficient strength to overcome this retarding effect and to feed the peanuts outwardly at the most efficient speed. The amount of such off-set, in a 26 inch diameter disk, is such as to bring the center lines of the channels tangent to a ⅜ inch diameter circle at the center of the disk. Opposite walls 32 are arranged to give a slight outward flare to channels 30, as shown. Sectors 8 and channels 30 terminate short of the center of disk 5 to provide a central feed space 17, said channels having their inner ends 34 flaring open and tangentially inclined inwardly against the direction of rotation to facilitate feeding of the nuts thereinto.

12 represents the hopper for nuts having a shaking chute 13 operated from eccentric 14 on the shaft 4 through link 15, pressed laterally against eccentric 14 by a spring (not shown). The chute 13 feeds the nuts through the central hopper 16 carried by casing 7 into the central feed space 17 on disk 5, from which the nuts are thrown radially outward into channels 30. In this passage outwardly through the channels the nuts are freely rotated and tumbled, the rapid movement of disk 5 causing them to bound and rebound from said disk, and against the walls, impact appearing to have the effect of breaking the skin so that it completely separates from the nut. The nuts are discharged outwardly of the disk into hopper 19, while the skins are drawn into an annular conduit 21 leading to blower 22, and thence exhausted into the atmosphere or into a suitable receptacle. Hopper 19 discharges through spout 36, from which the nuts may be packed for shipment. Conduit 21 is suspended from arms 3 independently of cover 7 by stay-rods 35, hopper 19 being secured to conduit 21.

Adjustably mounted on cover 7 in hopper 16 over central feed space 17 and just within vertices 33, is a cylindrical damper 37 which may be raised or lowered by adjusting screws 38, thereby controlling the inlet of air to channels 30. Damper 37 is never lowered sufficiently to interfere with the passage of peanuts into said channels. A second cylindrical damper 39, forming the inner wall of conduit 21, is mounted in the space between the periphery of disk 5 and hopper 19, and controls the upward suction of air into conduit 21 at this point. Damper 39 is raised or lowered for adjusting purposes by screws 40 carried in conduit 21. Each of dampers 37 and 39 is lined with felt to prevent splitting of the nuts by violent impact. Regulation of damper 37 is a means for controlling the travel of the nuts through the channels 30. An annular strip of felt 41 is mounted on the upper surface of cover 7 and overhangs the latter to seal the intervening annular space between damper 39 and cover 7. Between conduit 21 and blower 22 is damper 47.

Disk 5 is driven from motor 23 through shaft 24 and belt 25 to pulley 26, while blower 22 on shaft 28 is driven by belt 27. Hopper 19 is detachably secured to conduit 21, and may be readily removed to provide access to disk 5. Shaft 4 is slidably mounted in arms 3, and is raised or lowered by a collar 42 carried on its upper end and actuated through a lever 43 by an adjusting screw 44 pivotally mounted on frame 2 as at 45, lever 43 being fulcrumed on link 46 pivoted to frame 2. Disk 5 may thus be raised and lowered for adjusting purposes.

In Figures 6 and 7 is shown a modified form of channel, in which sheet metal vanes 50 are used in place of sectors 8. Vanes 50 are flanged as at 51 to provide for attachment to the under surface of cover 7 by screws 52 through holes 53 in said cover. Flanges 51 are provided with slots 54 for screws 52, thereby permitting a slight angular adjustment for vanes 50, so that, as conditions may require, channels 30 may be slightly flared, or choked, or offset slightly from strictly radial alignment. Depending from flanges 51 and extending almost into contact with surface 6, leaving only a reasonable clearance therebetween, are walls 55, the latter being downwardly inclined in the direction of rotation. Vanes 50 terminate at the periphery of wheel 5, and extend inwardly for about three-quarters of the radius of the disk, leaving a feeding space 17 at the center. Flanges 51 terminate short of the inner ends of walls 55, and each of the latter at its inner end is connected to the inner end of the adjacent wall 55 of the adjacent channel 30, thereby closing said central feeding space except through said channels 30. Vanes 50 are preferably formed as shown, in integral V-shaped pairs with the vertex 56 disposed inwardly, said vertex 56 being somewhat inclined tangentially against the direction of rotation to guide the nuts into channels 30, and to provide a flaring open end to receive the nuts. The flexibility of the material at vertex 56, where flange 51 is discontinued, is sufficient to permit adjustment for radial angularity.

So far as I am aware a machine wherein peanuts are freely tumbled to remove the skins is new in this art, it being seen that the nuts are not under pressure during the blanching, being free to move and tumble in the radial channels provided by the vanes according to the velocity of the disk and the strength of the air blast, and in actual operation a much lower percentage of flats and higher percentage of complete removal of skins from whole nuts have been obtained than in previous machines with which I am familiar.

The machine is capable of various modifications and changes without departing from the scope of the appended claims. I am aware that it has heretofore been proposed to peel potatoes and similar vegetables by tumbling them in a rotatable container having a bottom of abrasive material, and that it has also been proposed to pass nuts under yielding positive pressure over an abrading surface, I regard a vegetable peeling machine as in a different art and involving different problems than that dealt with herein in blanching nuts while the yielding positive pressure of nuts on an abrading surface is objectionable as producing an undue percentage of flats. I am aware of the patents to Witt, No. 1,388,394 and No. 1,388,395 relating respectively to a machine and to a method for blanching peanuts; also of the patent to Gabbet-Fairfax No. 1,051,877 which discloses a machine for removing the husk from palm nuts. The following claims have been carefully drawn in view of said patents, neither of which disclose the method or apparatus herein set forth.

This application is a continuation, in part, of my previous application, Serial Number 484,220, filed July 12, 1921.

I claim the following:

1. The method of producing whole blanched peanuts which consists in partially and evenly roasting shelled nuts in a manner such as to render the skin readily separable by an air blast upon breaking, without spotting the nuts or decomposing the oils therein, and feeding the nuts in an air blast in contact with a roughened surface such as to break the skin upon impact and thereafter completely remove it without splitting the nut by the combined action of the air blast and the free tumbling movement of the nut over said surface.

2. The method of producing whole blanched peanuts, which consists in subjecting the shelled nuts to a slow continuous agitation at a roasting temperature and subsequently feeding the nuts in free tumbling contact across a moving roughened surface.

3. The method of producing whole blanched peanuts, which consists in partially roasting the shelled nuts in a current of heated gases while continuously tumbling the nuts to enable the skins to be removed subsequently by gentle impact, preventing spotting of the nuts and decomposition of the peanut oil during such heat treatment, then feeding said nuts in free tumbling contact across a traveling skin separating means, and removing the separated skins from the nuts.

4. The method of blanching previously prepared peanuts without producing a large percentage of flats, which consists in feeding the nuts in free tumbling contact across a moving roughened surface by means independent of the movement of said surface.

5. The method of blanching previously prepared peanuts without producing a large percentage of flats, which consists in feeding the nuts in an air blast across a roughened surface moving transversely to the direction of feed while preventing substantial transverse movement of the nuts.

6. The method of blanching previously prepared peanuts without producing a large percentage of flats, which consists in subjecting the nuts to an air blast while moving them transversely of a moving roughened surface, said nuts being in free intermittent contact with said roughened surface to cause the skins to be separated and carried away, and separately discharging the nuts.

7. The method of blanching peanuts which consists in feeding the nuts in the direction of an air blast in contact with skin separating means and then dropping the nuts against a countercurrent of air to remove the separated skins.

8. A nut blancher, comprising a movable roughened surface, and fluid means independent of the movement of said surface for feeding the nuts thereacross.

9. A nut blancher, comprising a movable roughened surface, means for depositing nuts on said surface, and means for directing an air blast against the nuts on said surface for feeding the same thereacross.

10. A nut blancher, comprising a roughened surface, a channel having its open side closed by said surface, means for effecting relative movement between said channel and surface while maintaining said relative position, such movement having a component normal to the channel, and gaseous means independent of said relative movement for feeding the nuts through said channel.

11. A nut blancher, comprising a roughened disk, a channel non-concentric with said disk and having its open side closed thereby, means for effecting relative rotation of said channel and said disk, and fluid means independent of the friction of said disk for feeding the nuts through said channel.

12. A nut blancher, comprising a movable roughened surface, a relatively stationary channel non-colinear with the direction of such movement and having its open side closed by said surface, and means for producing an air blast in said channel to feed nuts therethrough.

13. A nut blancher, comprising a rotatable roughened disk, a plurality of relatively stationary channels having their respective open sides closed by said disk, said channels terminating short of the center of the disk to provide a central feed space, means for feeding nuts to said central feed space, and means for feeding the nuts through said channels.

14. In a peanut blancher, a channel, means for feeding peanuts through said channel, roughened skin separating means contacting the peanuts in their passage through said channel, and means for maintaining an air blast in said channel to facilitate separation of the skins.

15. In a nut blancher, a channel, movable roughened means closing an open side of said channel, means for producing an air blast in said channel, and means for regulating the strength of said air blast.

16. In a peanut blancher, a channel, means for introducing peanuts into said channel, means for maintaining an air blast through said channel to feed the peanuts therethrough and to facilitate separation of the skins, roughened skin separating means contacting the peanuts in their passage through said channel, and means for maintaining an upward draft of air around the peanuts falling from the discharge end of said channel to remove the separated skins.

17. In a peanut blancher, a channel, movable skin separating means closing an open side of said channel, means for feeding a nut through said channel in contact with the skin separating means and for dropping the nut from the discharge end of the channel, and means for maintaining a draft of air across the path of the falling nut to remove the separated skin.

18. In a peanut blancher, a channel, movable skin separating means closing an open side of said channel, means for feeding a nut through said channel in contact with the skin separating means and for dropping the nut from the discharge end of the channel, means for maintaining a draft of air across the path of the falling nut to remove the separated skin, and means for regulating the strength of said draft.

19. In a nut blancher, a channel, means for introducing peanuts into said channel, means for maintaining an air blast through said channel to feed the peanuts therethrough and to facilitate separation of the skins, roughened skin separating means contacting the peanuts in their passage through said channel, means for maintaining an air blast across the path of the peanuts falling from the discharge end of said channel to remove the separated skins, and separate means for regulating said respective air blasts.

20. A nut blancher comprising a rotatable roughened disk, a casing spaced from and enclosing the disk, means for feeding nuts at the center of the disk, means for directing the nuts outwardly across the disk, an air blast means connected with the casing to remove skins discharged at the periphery of the disk, and means for receiving nuts discharged by the disk.

21. The combination with a rotating roughened disk and relatively stationary, more or less radial channels adjacent said disk, the latter closing the open sides of said respective channels, of a hopper discharging nuts at the center of the disk, and means for producing an air blast outwardly through said channels.

22. In combination with a moving roughened surface, guide means adjacent said surface, and means for producing an air blast in said guide means to tumble the nuts to be treated over said roughened surface, thereby removing the skins.

23. In combination with a moving roughened surface, a guide for nuts to be treated, comprising a channel relatively stationary to and adjacent said surface and having side walls inclining toward the direction of movement of said surface as they approach the same.

24. In a nut blancher, a roughened disk, means for rotating said disk, a plurality of relatively stationary channels having their respective open sides closed by said disk, said channels terminating short of the center of the disk to provide a central feed space, the inner ends of said channels being tangentially inclined against the direction of rotation to receive the nuts from said central feed space, and means for feeding the nuts through said channels.

25. In a nut blancher, the combination of a rotatable roughened disk with a relatively stationary channel having its open side closed by the disk, said channel terminating short of the center of the disk and having its inner end tangentially inclined against the direction of rotation.

26. In a nut blancher, the combination of a rotatable roughened disk with a relatively stationary channel having its open end closed by the disk, said channel terminating short of the center of the disk and having its inner end flaring and tangentially inclined against the direction of rotation.

27. A nut blancher comprising a rotatable roughened disk, a plurality of relatively stationary channels having their respective open sides closed by said disk, means for feeding nuts through said channels across said disk, and means for moving said disk toward and from said channels for adjustment.

28. A nut blancher comprising a substantially vertical shaft, means for driving said shaft, a substantially horizontal roughened disk carried by said shaft, relatively stationary guide means adjacent the upper surface of said disk, means for feeding nuts through said guide means across said disk, and means for reciprocating said shaft to raise and lower said disk for adjusting purposes.

29. In combination with a rotatable roughened disk, means forming a plurality of more or less radial channels having inclined walls, the open sides of said respective channels being closed by said disk.

30. In combination with a rotatable roughened disk, means forming a plurality of more or less radial channels having their respective open sides closed by said disk, the walls of said channels being inclined to the disk, and each pair of walls being mutually parallel except for the portion of the overhanging wall adjacent the disk being perpendicular thereto.

31. In combination with a moving roughened surface, means disposed to form a channel relatively stationary to and adjacent said surface and having walls inclining toward the direction of movement of said surface as they approach the same, the portion of the over-hanging wall adjacent said surface being perpendicular thereto.

32. In combination with a rotatable disk, guide means comprising a member having a wall more or less radial to said disk and adjacent thereto, the portion of said wall immediately adjacent said disk being perpendicular thereto, and the remaining portion of said wall being inclined to said disk.

33. In combination with a rotatable disk, guide means comprising a member having a wall more or less radial to said disk and adjacent thereto and having a portion inclined to said disk.

34. As an article of manufacture, a sector-shaped member having its radial walls inclined, one of said inclined walls having a vertical portion adjacent one edge and forming a concave angle with the inclined portion.

35. A nut blancher comprising in combination, a guide channel through which the nuts are moved, a roughened surface closing the channel, mechanism for producing relative movement between the channel and surface, and means for freely tumbling the nuts resting on said surface and moving them through the channel.

36. A nut blancher comprising in combination, a roughened surface, a guide channel through which the nuts are moved over said surface, a wall of said channel being inclined to said surface, and means for producing relative movement between said channel and surface.

37. In a nut blancher, a roughened surface, a guide channel disposed substantially radially of the surface, means for producing relative rotation between said channel and said surface, and means for freely tumbling the nuts in said channel and over the surface.

38. In a nut blancher, a casing having substantially radially disposed guides thereon, and means comprising an abrading surface and a mechanism for generating a current of air for freely passing the nuts along said guides to remove the skins.

39. The combination with a roughened surface, of a guide channel extending over said surface, and through which the nuts are adapted to be passed, means for producing relative movement between the channel and surface, and means for varying the shape of said channel.

40. In a nut blancher, the combination with a roughened surface, of a guide channel for the nuts arranged substantially radially over said surface, a wall of said channel being inclined about 62°, and means for effecting relative movement between the surface and channel.

41. In a nut blancher, the combination with a roughened surface, of a guide channel through which the nuts are passed substantially across said surface, said channel being outwardly flared.

42. In a nut blancher, the combination with an abrading surface, of a guide channel through which the nuts are passed across said surface, said channel being outwardly flared, and means for adjusting the amount of said outward flare.

43. In a nut blancher, the combination with a guide channel, of a roughened surface closing the bottom of said channel, means for effecting relative rotation between said surface and channel, means for passing a current of gas through said channel, and a damper controlling the feed end of said channel.

44. The combination with a guide channel, of an abrading surface closing the bottom of said channel, means for effecting relative rotation between said channel and surface, fluid pressure means for freely tumbling the nuts through said channel, and dampers at each end of said channel.

45. In a nut blancher, the combination with a rotary roughened surface, of a plurality of substantially radial guide channels, means for producing a current of air for freely tumbling the nuts through said channels and over said surface, a central feed space for the nuts, and an adjustable damper between said channels and feed space.

Signed at New York, in the county of New York, and State of New York, this 17th day of March, A. D. 1922.

RICHARD A. GREENE.